United States Patent [19]
Chang

[11] Patent Number: 5,813,503
[45] Date of Patent: Sep. 29, 1998

[54] LUGGAGE CASE STRUCTURE WITH RETRIEVABLE HANDLE AND WHEELS

[76] Inventor: Yuan-Chi Chang, No. 66, Lane 71, Sec.1, Fu-Kuang Rd., Taichung, Taiwan

[21] Appl. No.: 751,398

[22] Filed: Nov. 18, 1996

[51] Int. Cl.⁶ ....................................................... A45C 5/14
[52] U.S. Cl. ........................... 190/18 A; 190/115; 280/37
[58] Field of Search ................................. 190/18 A, 115, 190/39; 280/37, 43.1, 43.17, 47.18; 16/34

[56] References Cited

U.S. PATENT DOCUMENTS

| | | | |
|---|---|---|---|
| 4,087,102 | 5/1978 | Sprague | 16/115 X |
| 4,588,055 | 5/1986 | Chen | 190/115 X |
| 5,533,231 | 7/1996 | Bai | 280/655.1 X |

FOREIGN PATENT DOCUMENTS

| | | | |
|---|---|---|---|
| 21489 | 2/1984 | United Kingdom | 190/18 A |

*Primary Examiner*—Allan N. Shoap
*Assistant Examiner*—Tri M. Mai
*Attorney, Agent, or Firm*—Bacon & Thomas

[57] ABSTRACT

A luggage case structure with a retrievable handle and wheels having a case body, a locating cover member, a handle, two wheel sets, two L-shaped fixing plates, two L-shaped linking members, two locking plates, and two locking seats. The case body has two stepped wheel seats into which the wheel sets are assembled by pivot pins are located. And via the L-shaped linking members. The handle controls the movement of the wheel sets. Thus, when not in use, the handle is withdrawn inside the case body will and abuts against L-shaped linking members which will retrieve the wheel sets into their stepped wheel seats so that the luggage case can be placed evenly on the ground. Yet, when the handle is drawn out of the case body for use, the wheel sets in a mechanism will spring out of the stepped wheel seats.

2 Claims, 5 Drawing Sheets

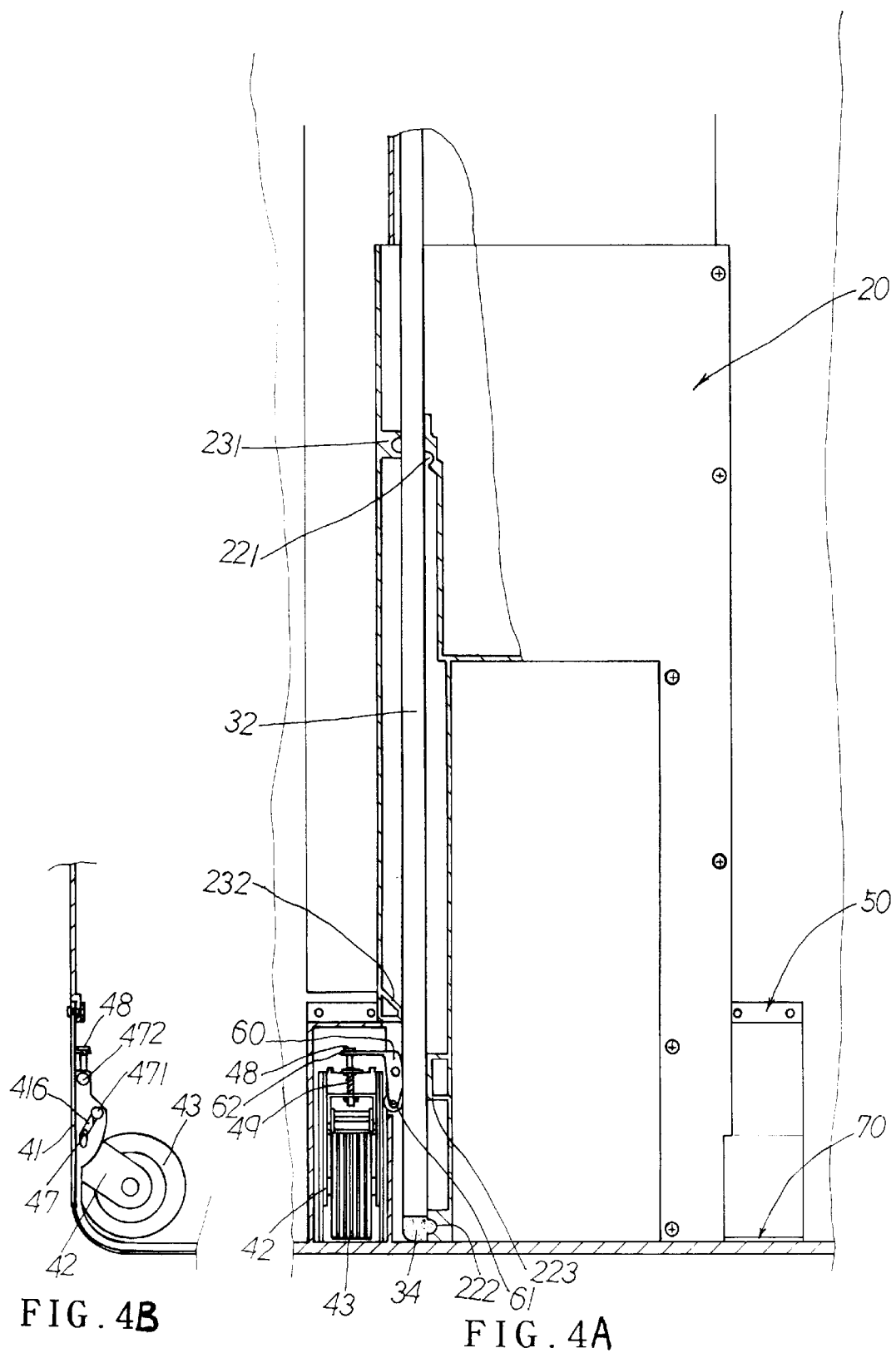

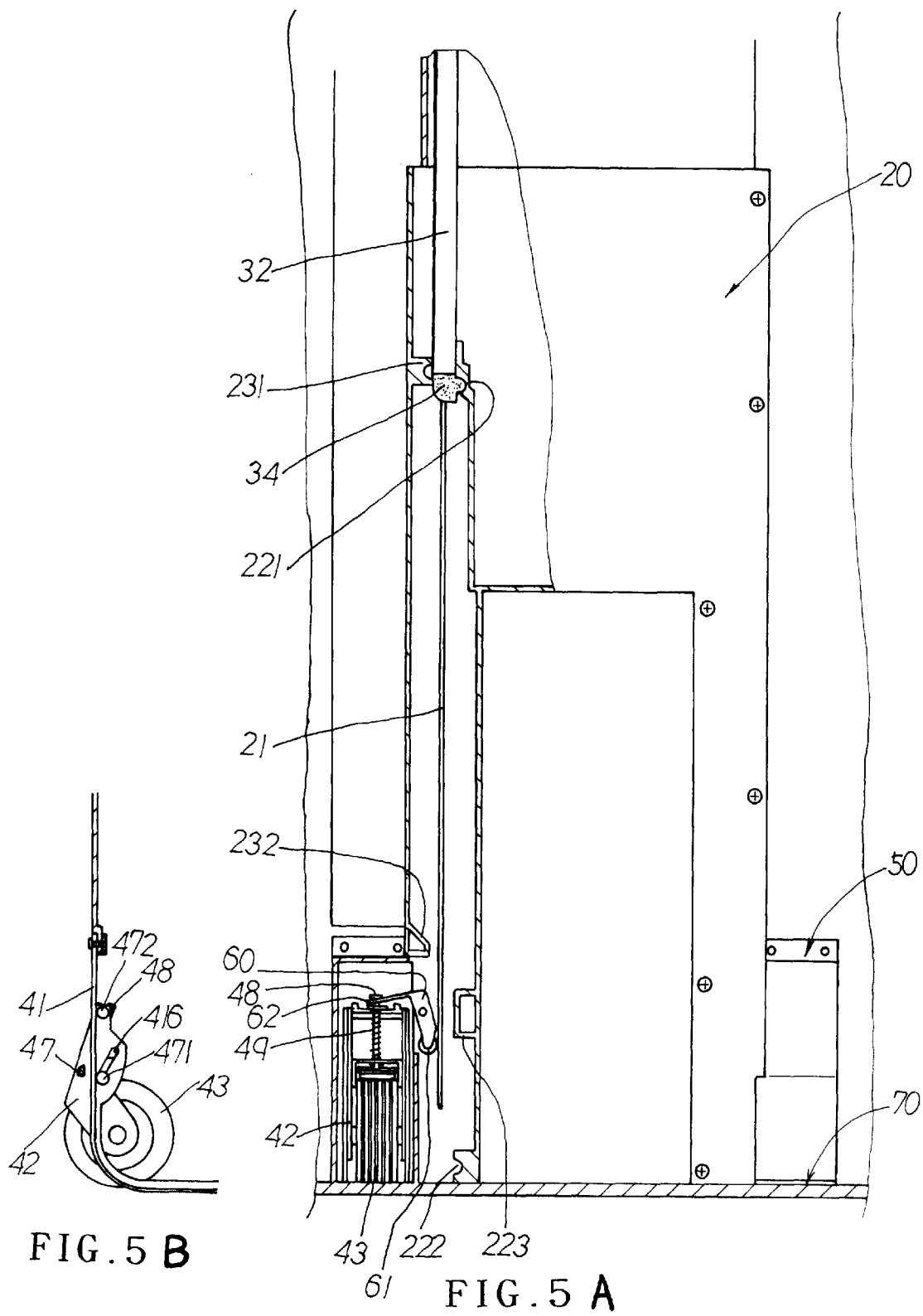

LUGGAGE CASE STRUCTURE WITH RETRIEVABLE HANDLE AND WHEELS

BACKGROUND OF THE INVENTION

The present invention relates to a luggage case structure equipped with a retrievable handle and wheels which can be freely displayed for use or retrieved for concealing in accordance with different occasions.

Conventional luggage cases with a retrievable handle are mostly independently formed, equipped with a handle which is simply drawn out or retrieved within the luggage cases. Besides, the wheel sets are also individually moulded and fixedly exposed on the four corners at the bottom of the luggage case to facilitate the movement of the luggage case. Yet, when not in use, the wheel sets become in turn a disadvantage, hindering the luggage case from being placed evenly on the ground.

SUMMARY OF THE INVENTION

It is therefore the primary object of the present invention to provide a luggage case structure with a retrievable handle and wheels, whereby the extension of the handle for use will trigger and spring out the wheels simultaneously and the withdrawal of the handle will retrieve also the wheels, permitting the luggage case to be placed evenly on the ground.

BRIEF DESCRIPTION OF THE DRAWINGS

FIGS. 4A–B are sectional views showing the mechanism of the wheels retrieved triggered by the withdrawal of the handle. FIGS. 5A–B are sectional views showing the spring out of the wheels triggered by the display of the handle.

DETAILED DESCRIPTION OF THE PREFERRED EMBODIMENTS

Figure 1:
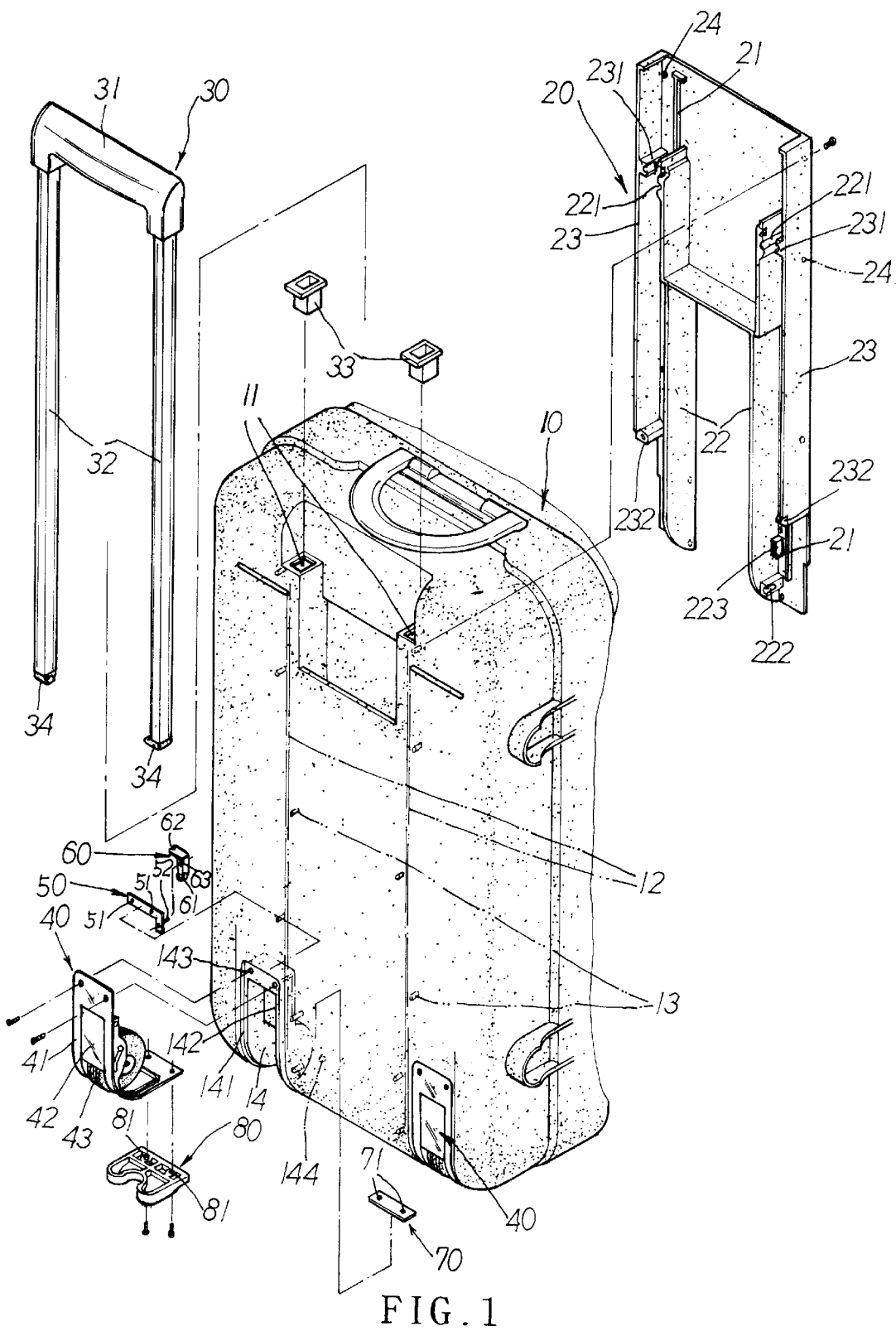
FIG. 1 is a perspective exploded view of the present invention.
Figure 2:
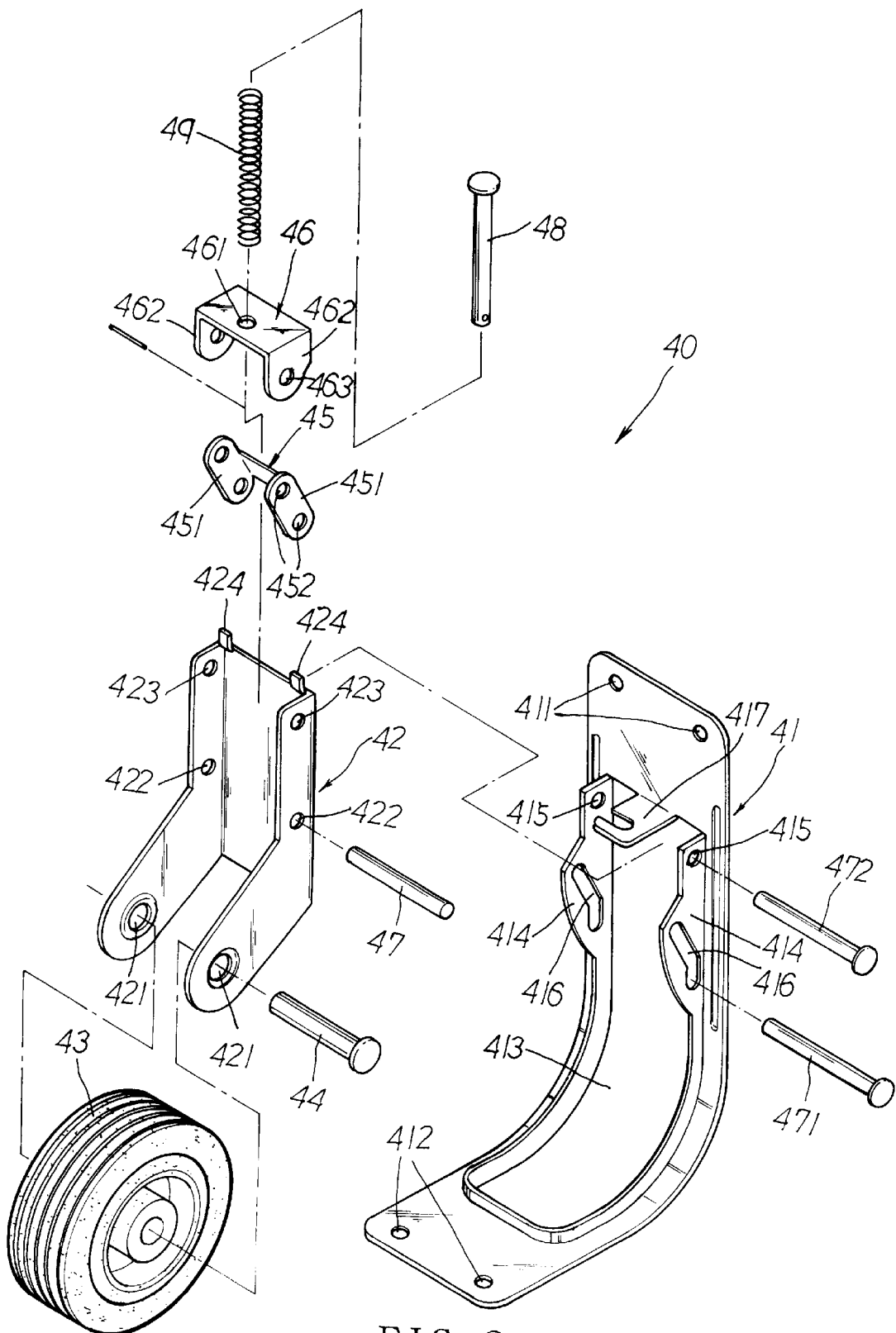
FIG. 2 is a perspective exploded view of the wheel sets of the present invention.

Please refer to FIG. 1. The present invention relates to a luggage case structure with a retrievable handle and wheels, comprising a case body 10, a locating cover member 20, a handle 30, two wheel sets 40, two L-shaped fixing plates 50, two L-shaped linking members 60, two locking plates 70, and two locking seats 80.

The case body 10 is provided with two opposite handle holes 11 at the rear upper outer side. Two ribs 12 are disposed at the rear inner side of the case body 10, extending downwardly from the opposite handle holes 11 and provided with several fixing posts 13 located on both side of the ribs 12. Two opposite stepped wheel seats 14 are provided at the rear lower outer side of the case body 10, whereby, the lower steps of the wheel seats 14 define an arch while the upper steps stay in a plane surface. A frame groove 141 is disposed, defining the periphery of both upper and lower steps of the stepped wheel seats 14. Two opposite rectangular holes 142 are disposed at the inner wall of the upper step or the stepped wheel seats 14 and two sets of opposite circular holes 143, 144 are provided at the upper and lower sections of the stepped wheel seats 14 respectively.

The locating cover member 20 has two opposite locating ribs 21, extending along a lateral underside thereof, corresponding to the ribs 12 of the case body 10. Each of the locating ribs 21 is surrounded by two lateral flanges 22, 23 from both sides. Two locating grooves 221, 222 are formed at one side of the the upper and lower sections of the inner opposite lateral flanges 22, while two abutting blocks 231, 232 are provided at the corresponding side of the upper and lower sections of the outer lateral flanges 23. A block 223 is disposed at one side of the lower section of the inner flanges 22 and several engaging holes 24 are arranged, crisscrossing the locating ribs 21 from both sides and corresponding to the fixing posts 13 of the case body 10.

The handle 30 is equipped with a handle bar 31 transversely disposed at the middle section and two rods 32 extending perpendicularly downwardly from both sides, each rod 32 joined with a fixing sleeve 33 and ended with an engaging protruding block 34.

The wheel set 40 has a wheel plate 41, a wheel receiving seat 42, a rubber wheel 43, a wheel shaft 44, a pivot member 45, a control member 46, three pivot pins 47, 471, 472, a control pin 48, and a spring set 49. The wheel plate 41 arched at the lower middle section to match the periphery of the rubber wheel 43 comprises two sets of through holes 411, 412 disposed at the upper and lower sections respectively and a wheel groove 413 defining the same configuration of the wheel plate 41 in the middle section thereof for the,wheel 43 to pass therethrough. Extending vertically and inwardly at both upper lateral sides of the wheel groove 413 are two opposite pivoting walls 414, each having a pivot hole 415 disposed at the top and a bent elongated oval slot 416 at the lower section thereof. A fending plate 417 is vertically disposed at the top middle section of the wheel groove 413, defining a pivot recess at one side. The wheel receiving seat 42 tilting slightly downwardly at both ends is provided with two wheel pivot holes 421 at both ends. Two sets of opposite pin holes 422, 423 are formed respectively at the lateral upper and middle sections of the wheel receiving seat 42. And two opposite strenghtening plates 424 are provided at the top lateral sides of the wheel receiving seat 42. The pivot member 45 has two elongated oval plates 451 extending perpendicularly downwards from both lateral sides, each provided with pivot holes 452 at both ends. The control member 46 has a control pin hole 461 at the top middle thereof and two protruding ears 462 extending perpendicularly downwards from both lateral sides of the control member 46, each having a pivot hole 463 disposed at the middle section thereof.

The L-shaped fixing plate 50 includes a transverse and vertical sections with two screw holes 51 at the transverse section and a round post 52 at the end of the vertical section.

The L-shaped linking member 60 is equipped with a roller 61 at one end, a V-shaped notch 62 at the other end, and a pivot hole 63 at the middle section.

The locking plate 70 is provided with two screw holes 71 at both lateral sides; while the locking seat 80 is disposed with two locking holes at one lateral side.

Figure 3:
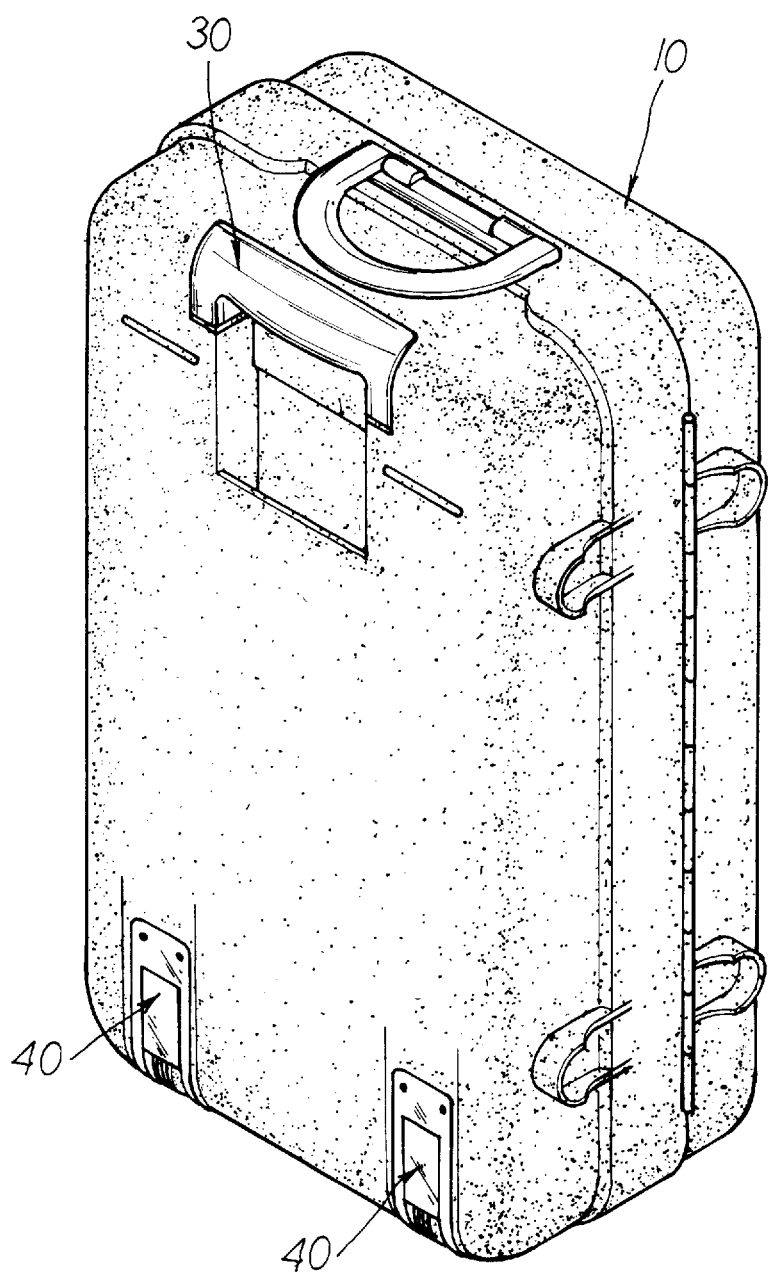
FIG. 3 is perspective assembled view of the present invention.

Please refer to FIG. 3. In assembly, the rubber wheels 43 are engaged with the wheel receiving seat 42 via the wheel shaft 44 passing through the rubber wheels 43 and the wheel pivot holes 421 disposed at both ends of the wheel receiving seat 42. The pivot member 45 is then adapted to engage with the wheel receiving seat 42 via the pivot pin 47 passing first through one pin hole 422 disposed at one middle lateral section of the wheel receiving seat 42, then the first set of the pivot holes 452 disposed at the elongated oval plates 451 of the pivot member 45, and finally out of the other pin hole 422 disposed at the other middle lateral section of the wheel receiving seat 42. The wheel receiving seats 42 engaged with the rubber wheels 43 are then positioned into the wheel grooves 413 of the wheel plates 41. The second pivot, pin 471 is then adapted to pass respectively at one side the bent elongated oval slot 416 disposed at the lower section of the pivot walls 414 of the wheel groove 413, the pivot hole 463 disposed at the protruding ears 462 of the control member 46, and the second set of the pivot holes 452 disposed at the elongated oval plates 451 of the pivot member 45 therethrough, and then come out in order at the other side. The third pivot pin 472 is adapted to join the pivot holes 415 disposed at the upper section of the pivot walls 414 of the wheel groove 413 and the pin holes 423 disposed at the upper lateral section of the wheel receiving seat 42. The control pin 48 is then passed through the fending plate 417 disposed at the upper middle section of the wheel groove 413 via the pivot recess of the fending plate 417, pressing there-through the spring member 49 and the control pin hole 461 disposed at the top middle of the control member 46 and finally stopped by a little pin at the bottom end to complete the assembly of the wheel sets 40.

The L-shaped linking member 60 is pivotally joined to the L-shaped fixing plate 50 by engaging the pivot hole 63 disposed at the middle section of the linking member 60 thereof with the round post 52 disposed at the vertical section of the fixing plate 50 thereof. From the inner side of the case body 10, the L-shaped fixing plate 50 is then positioned at the top section of the stepped wheel set 14 and the locking plate 70 at the bottom section of the stepped wheel set 14. The wheel set 40 can then be placed into the stepped wheel set 14 with the peripheral flange of the wheel plate 41 of the wheel set 14 fitting into the frame groove 141 of the stepped wheel set 14 thereof and the V-shaped notch 62 of the linking member 60 engaging with the head of the control pin 48 of the wheel set 40. The locking seat 80 is placed under the bottom of the wheel set 40 and fixed to the locking plate 70 disposed at the inner side of the case body 10 by screws passing through the screw holes 81 of the locking seat 80, the through holes 412 of the wheel plate 41, two round holes 144 disposed at the bottom of the stepped wheel set 14, and the screw holes 81 of the locking plate 70 thereof. Moreover, screws are passed through the through holes 411 disposed at the upper section of the wheel plate 41, two round holes 143 at the top of the stepped wheel set 14 and the screw holes 51 disposed at the transverse section or the L-shaped fixing plate 50 at the inner side of the case body 10 so as to fix the wheel 40 set onto the case body 10.

The rods 32 of the handle 30 are led through the opposite handle holes 11 of the case body 10, penetrating the case body 10, while the fixing sleeves 33 are stopped outside the mouth of the opposite handle holes 11. The locating cover member 20 is then positioned at the interior of the case body 10 with the locating ribs 21 of the locating cover member 20 corresponding to the ribs 12 disposed at the inner rear of the case body 10 which, together with the lateral flanges 22, 23 surrounding the ribs 21 thereof as well as the ribs 12 of the case body 10, defines and limits the passage of the rods 32 of the handle 30. Finally, screws are adapted to fix the locating cover member 20 to the case body 10 by passing through the engaging holes 24 disposed along the ribs 21 of the locating cover member to the fixing posts disposed at the inner rear along the ribs 12 of the case body 10.

Please refer to FIGS.4A–B. To conceal the wheel sets 40 when not in use, the handbar 31 of the handle 30 is pushed downwardly, forcing the rods 32 of the handle 30 to go completely into the case body 10. The lower section of the rods 32 of the handle 30 will abut against the rollers 61 disposed at the bottom of the L-shaped linking members 60 at one side, while the engaging protruding blocks 34 ended the rods 32 of the handle 30 are positioned within the locating grooves 222 disposed at the bottom inner lateral flanges 22 of the locating cover member 20 at the other side. The L-shaped linking members 60 abutted against the retrieved rods 32 of the handle 30 will consequently pull upward and fix the control pins 48 engaged with the linking members 60 via the V-shaped notches 62 disposed at one end of the L-shaped linking members 60 thereof; which comprises the spring members 49 and pulls upward the control members 46. And thus triggered by the control members 46 and pivot members 45 associated with the wheel sets 40 via the three pivot pins 47, 471, and 472, the rubber wheels 43 will pivot inward for storing within the stepped wheel seats 14 Please refer to FIGS. 5A–B. To extend the wheel sets 40 for use, the handlebar 3l of the Handle 30 is pulled upwardly, disengaging the protruding blocks 34 disposed at the end of the rods 32 of the handle 30 from the locating grooves 222 of the locating cover member 20 so as to reveal the rods 32 of the handle 30 completely outside the case body 10 until the protruding blocks 34 are engaged with the locating grooves 221 disposed at the upper section of the inner lateral flanges 22 of the locating cover member 20. The L-shaped linking members 60 released from the abutment of the rods 32 of the handle 30 against the rollers 61 thereof will in turn lower the control pins 48 engaged with the V-shaped notches 62 thereof due to spring members 49 and the control members 46. Consequently, in the mechanism of the control members 46 and the pivot members 45 associated with the wheel sets 40 via the pivot pins 47, 471, and 472, the rubber wheels 43 will pivot out of the stepped wheel seats 14 of the case body 10 to complete the display of the wheel sets 40. Furthermore, by means of the bend of the elongated oval slots 416 of the wheel plates 41, the pivot pins 471 located at the bottom end of the bent elongated slots 416 thereof will not dislocate, preventing the rubber wheels from rolling back into the stepped wheel seats 14.

What is claimed is:

1. A luggage case having a case body and a retractable handle movable between extended and retracted positions, the handle having two rods joined by a handle bar at a first end, each of the rods having a second end, the luggage case comprising:

a) a plurality of retractable wheel assemblies attached to the case body, each retractable wheel assembly comprising:

i) a wheel plate attached to the case body, the wheel plate having a wheel groove opening, a wall located on opposite sides of the wheel groove opening, each wall having an elongated slot with a first portion extending at an oblique angle to a second portion;

ii) a wheel receiving seat having a wheel rotatably attached thereto the wheel receiving seat pivotally connected to the wheel plate such that the wheel is movable between extended and retracted positions relative to the case body;

iii) a pivot member comprising a pair of interconnected spaced apart elongated plates, each plate having first and second ends with a pivot hole at each end, the pivot member pivotally connected to the wheel receiving seat at the first ends;

iv) a control member;

v) a pivot pin passing through the elongated slots of the wheel plate, the second ends of the plates of the pivot member and the control member to pivotally connect these elements together;

vi) a control pin connected to the control member; and,
vii) a spring acting between the control member and the wheel plate to bias the wheel toward the extended position; and, b) a generally "L-shaped linking member having a first leg in contact with the control pin and having a second leg, the linking member being pivotally connected to the wheel plate adjacent to a juncture of the first and second leg;

whereby one of the rods of the handle contacts the second leg of the linking member when the handle is in the retracted position so as to move the linking member about its pivot point thereby causing movement of the control pin to overcome the spring biasing force and move the wheel to the retracted position and movement of the handle to the extended position moves the associated rod out of contact with the second leg enabling the spring to move the wheel to the extended position.

2. The luggage case of claim 1 further comprising a generally L-shaped fixing plate attached to the wheel plate, the fixing plate having a post extending therefrom on which the linking member is pivotally mounted.

\* \* \* \* \*